United States Patent [19]

Weissman

[11] 3,941,496

[45] Mar. 2, 1976

[54] DRILLING MACHINE FOR PLASTER CASTS OR MODELS

[76] Inventor: Bernard Weissman, 236 Fifth Ave., New York, N.Y. 10001

[22] Filed: Sept. 25, 1974

[21] Appl. No.: 509,078

Related U.S. Application Data

[62] Division of Ser. No. 320,275, Jan. 2, 1973, Pat. No. 3,854,836.

[52] U.S. Cl. ............... 408/130; 408/111; 408/129; 408/136
[51] Int. Cl.² .................. B23B 47/22; B23B 49/00
[58] Field of Search .......... 408/130, 129, 136, 111, 408/72, 3, 16, 4, 241; 173/152

[56] References Cited
UNITED STATES PATENTS

| | | | |
|---|---|---|---|
| 1,148,640 | 8/1915 | Wehner | 408/3 |
| 3,120,136 | 2/1964 | Bieker | 408/1 |

*Primary Examiner*—Donald R. Schran
*Assistant Examiner*—W. R. Briggs
*Attorney, Agent, or Firm*—Friedman & Goodman

[57] ABSTRACT

A drilling machine for drilling holes in plaster casts or models has a frame which supports a stationary drilling platform having an opening therethrough. A motor housing is positioned below the drilling platform and is vertically movable between a rest and a drilling position on two laterally disposed top guide shafts and a centrally disposed bottom guide pin. A motor is mounted in the housing and supports a drill chuck and drill bit which penetrates through the opening to drill a hole in a cast or model on the drilling platform when the housing is moved upwardly to its drilling position. A U-shaped handle pivotally mounted on the frame and engageable with the housing permits manual raising of the housing. Alternately, a pneumatic system is described which includes a piston arrangement for raising the housing to the drilling position independently of the position of the handle. During pneumatic operation, the handle may be locked in its rest position. In each case, the handle is disposed in the region of the drilling platform so that the handle and the cast or model may be simultaneously gripped to secure the model during drilling. An overhanging locating light assembly is spaced over the opening of the drilling platform and vertically aligned therewith so that an indication— a lit portion where the light beam impinges on the model — is provided where the hole will be drilled. The beam of light from the locating light assembly can also be used for purposes of dental surveying.

11 Claims, 10 Drawing Figures

DRILLING MACHINE FOR PLASTER CASTS OR MODELS

This is a division of application Ser. No. 320,275 filed Jan. 2, 1973 now U.S. Pat. No. 3,854,836.

BACKGROUND OF THE INVENTION

The present invention relates to power driven drills, and more particularly to a drilling machine for drilling holes in plaster casts or models.

Various power-driven drilling machines are already known. Such drills typically include a motor drive which is connected, by means of a chuck assembly, to a drill bit which is suitable to form a hole in a work piece when the drill is turned by the motor and simultaneously advanced into the work piece. While some power-driven drills are hand held, numerous known types are available which provide a drilling surface on which a work piece may be securely positioned. While the known machines are frequently satisfactory for the purposes for which they are intended, the machines of the prior art have frequently lacked one or more features which would make them particularly suitable for drilling holes in plaster casts or models frequently used in the field of dental prosthodontics. The exacting specifications and features which are desirable in connection with such work include precise location of the holes which are drilled in the model as well as precise control over the depth to which the holes are drilled. Also of great importance is the characteristic that the holes be drilled in precise normal directions to the surfaces of the model which abut on the drilling surface or platform of the machine.

Many of the machines have not been adaptable for the drilling of numerous holes in a model with great speed and facility. Also, because of the irregular shapes of plaster casts or models, as well as the softness and brittleness of such models, it has not been feasible or practical to rigidly secure the same to the drilling platform and thereby prevent movement of the model during drilling. It has been observed that a suitable approach to prevent movement of the model during drilling is to have the technician performing the drilling hold the model with both hands while urging the same in pressure relationship against the drilling platform. The holding of the model with both hands has not been possible, however, with most prior art drilling machines since one hand has frequently been required to be used for purposes of actuating the machine or for purposes of effecting drilling operations of the machine. For example, according to a one prior art machine, a lever was provided on one side of the machine which required the operator of the machine to grip the same and move the same during the drilling operation. Clearly, such design prevents the technician from using both hands to securely hold the model on the drilling platform.

With respect to drilling machine models of the prior art which included other actuating means, e.g. foot-actuated means, most of these machines have been relatively complex in construction and costly to manufacture. Also, many of the models which have been actuated by means other than hand actuation have not provided the degree of control desirable for controlling the speed with which the drill bit is advanced in the direction of the work piece.

With respect to all of the above-mentioned known drilling machines, none of these have provided simple and effective locating means for indicating the precise locations where the holes were to be drilled. In most instances, the precise locations were not known until the hole to be drilled was actually initiated.

A drilling machine of the type under discussion utilized in the dental arts has not, in the past, been suitable for dental surveying. This has been a drawback of the known machines.

SUMMARY OF THE INVENTION

Accordingly, it is an object of the present invention to provide a drilling machine suitable for drilling holes in plaster casts or models which does not possess the disadvantages associated with such prior art machines.

It is another object of the present invention to provide a drilling machine the type under discussion which is simple in construction and economical to manufacture.

It is still another object of the present invention to provide a drilling machine as above described which includes an actuating handle which permits a technician to simultaneously actuate the machine and securely grip the model or cast with both hands.

It is yet another object of the present invention to provide a drilling machine for drilling holes in plaster casts or models which includes pneumatic actuating means for effecting drilling of the cast which does not require manual manipulations.

It is a further object of the present invention to provide a drilling machine as above which permits selective operation of the drilling machine whereby drilling may be effected by manual manipulations or by pneumatic means which may be, for example, foot-operated — the controls in each case being such as to permit the technician to fully grip the work piece while the latter is being drilled.

It is still a further object of the present invention to provide a drilling machine which includes a drilling platform and a motor housing positioned below the drilling platform and movable in vertical directions towards and away from said platform while being guided by two upper laterally disposed guide shafts and a lower centrally disposed guide pin.

It is yet a further object of the present invention, in connection with a drilling machine which may be both manually and numatically operated, to provide locking means which locks the position of a manually manipulatable handle so that the latter may be secured in place and utilized by a technician as an anchoring point for anchoring the hands while holding a work piece being drilled.

It is an additional object of the present invention to provide a drilling machine as above described which includes a locating light disposed above or overhanging the drilling platform which transmits a beam of light normal to the plane of the drilling platform and in vertical alignment with the drill bit so as to provide a precise indication of where a hole will be drilled in underside of the plaster cast or model abutting against the drilling platform.

It is still another additional object of the present invention to provide a drilling machine which includes a light indicator device so disposed above the drilling platform which makes it suitable for dental surveying.

It is yet an additional object of the present invention to provide a drilling machine of the type under discussion which includes stop means disposed between a movable drill or motor housing and a drilling platform which both precisely limits the depth of a hole drilled in a plaster cast supported on the drill platform while also preventing injury to a technician's fingers should they be interposed between the movable motor housing and the drill platform.

In order to achieve the above, as well as other objects which will become apparent hereafter, a drilling machine for drilling holes in a plaster cast in accordance with the present invention comprises a frame having a stationary horizontal drilling platform. Said drilling platform has an opening therethrough and a top surface adapted to support a cast which is positionable over said opening. Drilling means are provided which are mounted on said frame and positioned below said drilling platform and vertically movable between two spaced vertical positions. Said drilling means is adapted to receive and support a drill bit, said drill means being arranged to maintain the drill bit below said top surface in one of said positions while passing the drill bit through said opening and above said top surface in the other of said spaced positions. In this manner, a hole is drilled in the plaster cast positioned on said top surface covering said opening. Actuating means are provided for moving said drilling means from one of said positions to the other of said positions. According to one embodiment of the actuating means, the latter comprises a handle pivotally connected to said frame and engageable with said drilling means. Said handle extends at least partially adjacent the periphery of said drilling platform. In this manner, both said handle and the plaster cast to be drilled can be simultaneously manually gripped and said drilling means can be moved by moving said handle while securing the position of the plaster case during drilling of the latter.

According to another embodiment of the actuating means, the latter comprises a hydraulic system having a fluid cylinder connected to said drilling means. Said fluid cylinder has a movable piston with a shaft movable relative to said cylinder and engageable with said frame in an extended position. Fluid regulating means are provided for selectively supplying fluid to said cylinder to extend said shaft from said cylinder into engagement with said frame. Advantageously, both said handle as well as said hydraulic system are provided — each actuating means being capable of effecting drilling independently of the other actuating means.

According to another feature of the present invention, adjustable depth limiting means are provided which cooperate with said housing and said drilling platform for adjustably limiting the movement of said housing in the direction towards said drilling platform. In this manner, the depth of the holes drilled in the plaster cast can be closely controlled.

According to still another feature of the present invention, a locating light is provided which is spaced from and vertically aligned with said opening. said locating light is adapted to generate a beam of light directed normally to said top surface and through the center of said opening. In this manner, said beam of light impinges on a portion of the cast and the lit portion provides an indication of the location where a hole will be drilled when said drilling means moves from one to the other of said spaced positions.

According to yet a further feature of the present invention, said drilling means comprises a housing and guide means are provided for vertically guiding said housing. Said guide means comprises two downwardly extending guide shafts extending from said drilling platform to each side of said opening. Corresponding holes in the top of said housing are provided which are adapted to receive respective ones of said guide shafts. Also, an upwardly extending guide pin extends from said frame and a corresponding hole in the bottom of said housing is adapted to receive said guide pin.

In connection with the hydraulic system, means are provided for regulating the speed with which hydraulic fluid is permitted to enter the fluid cylinder to thereby regulate the speed at which said shaft extends from said cylinder.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which.

BRIEF DESCRIPTION OF THE PREFERRED EMBODIMENTS

Figure 1:
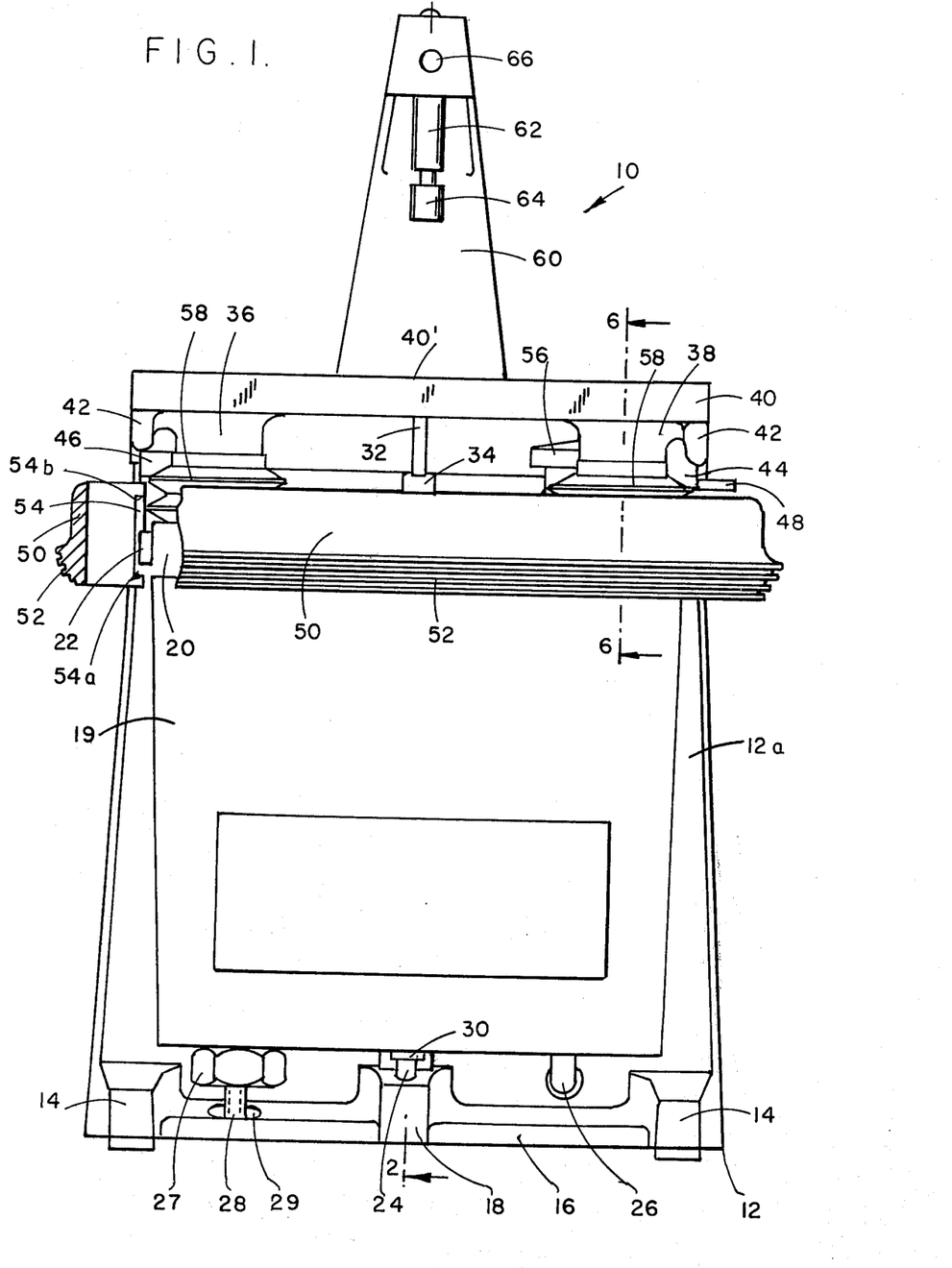
FIG. 1 is a front elevational view of the drilling machine in accordance with the present invention.
Figure 2:
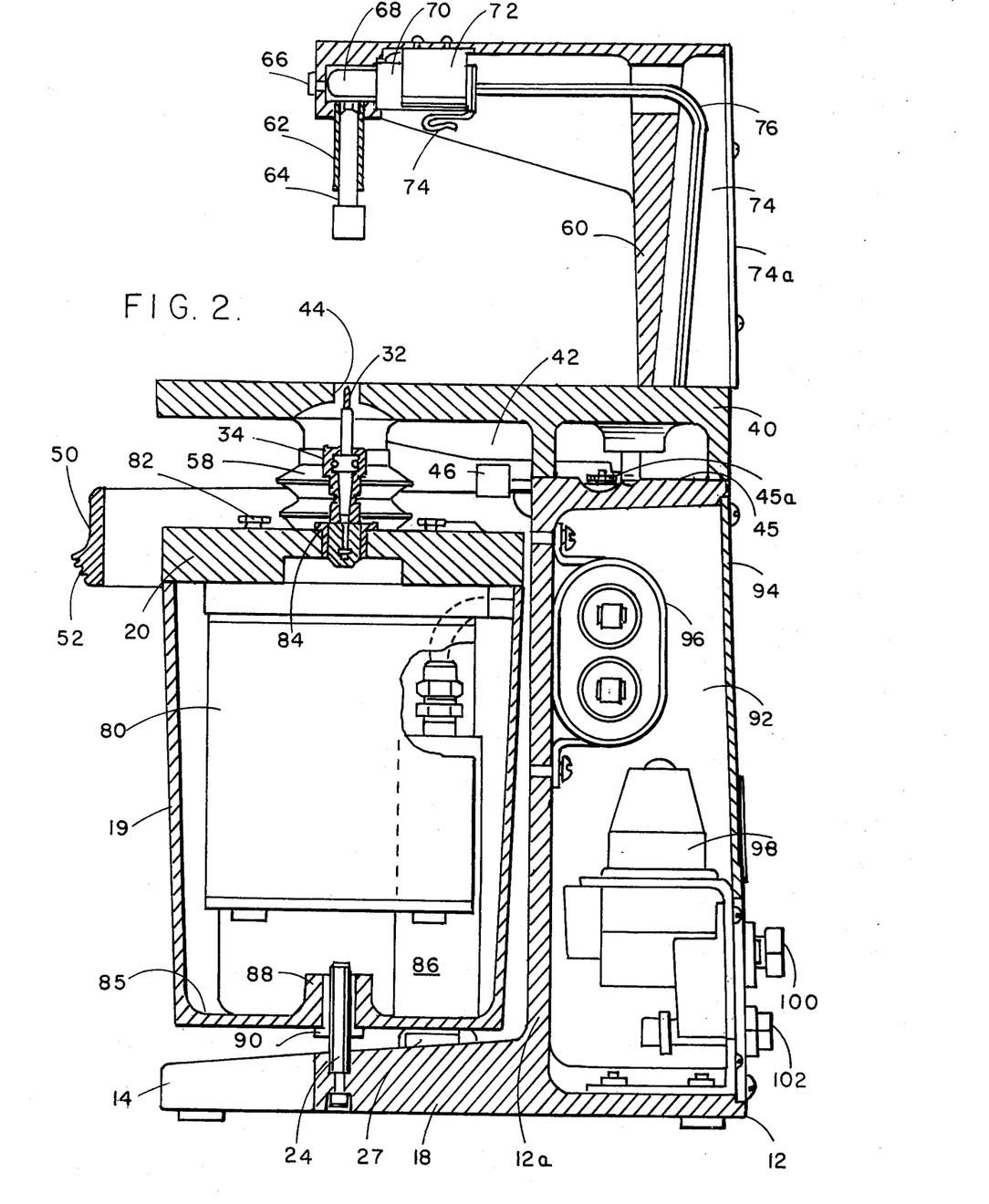
FIG. 2 is a cross-section of the drilling machine of FIG. 1 taken along line 2—2.

Referring now to the FIGURES, in which similar or identical parts have been designated by the same reference numerals, and first referring to FIGS. 1 and 2, a drilling machine 10 includes a cast frame 12 which is generally L-shaped. The frame 12 includes an upright portion 12a as well as a pair of horizontally extending base legs 14 disposed at each side of the frame 12.

Extending between the base legs 14 is a frame ledge 16 which extends a distance from the upright portion 12a for reasons to be described hereafter.

Extending substantially parallel to the base legs 14 is a protruding member 18 which protrudes a distance approximately equal to the length of the base legs, as best seen in FIG. 2.

The drilling machine 10 is stationary during normal operation and can be supported on a flat surface by positioning the base legs 14 thereon. Another component of the drilling machine 10 comprises drilling means which includes those components and members associated with the movement of a rotary member which is to perform the drilling function. The drilling means includes a motor housing 19 which is, in the presently described embodiment, a substantially rectangular enclosure as seen in FIGS. 1 and 2. The upper open end of the motor housing 19 is closable by a motor housing cover 20. Extending to the left and right sides of the motor housing cover 20, as viewed in FIG. 1, are pivot standoffs 22, also shown in FIG. 3. The function of the pivot standoffs 22 will be described hereafter.

The motor housing 19 is provided with a bottom wall 85 which is approximately centrally provided with a projection 88 in which a sleeve or bearing 90 is mounted. The sleeve or bearing 90 may either be in the form of a roller bearing for linear motion or may consist of an elastomeric material such as "Teflon" or "Nylon". A guide pin 24 is fixed in the protruding member 18, as best seen in FIG. 2, and extends through the sleeve or bearing 90 in sliding relation.

Shown in FIG. 1 are the electrical leads 26 which extend from the upright portion 12a to the interior of the motor housing 19.

Also provided at the bottom of the motor housing 19 is a nut 27 which is utilized to fasten an air cylinder 86, shown in FIG. 2, whose function will be described hereafter. The air cylinder 86 includes a piston rod or shaft 28 which moves relative to the motor housing 19 and extends downwardly in an activated state of the air cylinder 86 to abut against the frame ledge 16. A depression 29 may be provided in the frame ledge 16 to permit the motor housing 19 to fully move downwardly when the air cylinder 86 is not activated. In the event that the piston rod 28 extends excessively in its retracted position, the depression 29 permits the motor housing 19 to fully move downwardly to the extent permitted by a rubber stop 30.

Extending from the motor housing 20, in an upward direction, is a drill bit 32 which is connectable to a chuck assembly 34, best seen in FIG. 2.

Positioned to each side of the chuck assembly 34 are guide means in the form of guide shaft supporting portions 36, 38 which extend downwardly from a drilling platform 40. The drilling platform 40 is positioned above the motor housing 19 and includes a horizontal top surface 40' and an opening 41 through which the drill bit 32 can pass when the motor housing 19 is moved upwardly, as to be described hereafter. Extending along each of the sides of the drilling platform 40 are skirts 42 which function as abutment portions engageable with a right stop 44 and a left stop 46 respectively, as viewed in FIG. 1. The stops 44, 46 cooperate with each other by means of linkages, as to be more fully described in connection with FIG. 10. The stops 44, 46 may be used as a locking mechanism which is interposed between the abutment portions 42 and a handle 50. The normally movable handle 50 is thereby prevented from moving upwardly by virtue of having the stops 44, 46 respectively interposed between the handle and the stationary abutment portions 42. The conditions under which such locking may be desirable will be described hereafter in connection with the description of operation of the drilling machine 10.

Although to be more fully described in detail hereafter, the handle 50 is shown in FIGS. 1 and 2 as having elongated ribs 52 extending along the lower portion of the handle 50. The ribs 52 are provided to facilitate the gripping of the handle 50, as will become apparent hereafter.

Also extending from the motor housing cover 20 is a depth limiting means in the form of a stop 56 whose height above the motor housing cover 20 is adjustable. The drilling depth stop 56 is arranged to engage the lower surface of the drilling platform 40 when the motor housing 19 has reached its desired upward position. Clearly, the more the stop 56 initially projects from the motor housing cover 20, the less distance will the motor housing 19 be capable of moving upwardly prior to engagement of the stop 56 and the drilling platform 40. By limiting the upward movement of the motor housing 19, the extent to which the drill bit 32 extends above the top surface 40' of the drilling platform 40 and the depth of the holes drilled in a work piece, e.g. a dental cast or model, is correspondingly limited.

Figure 3:
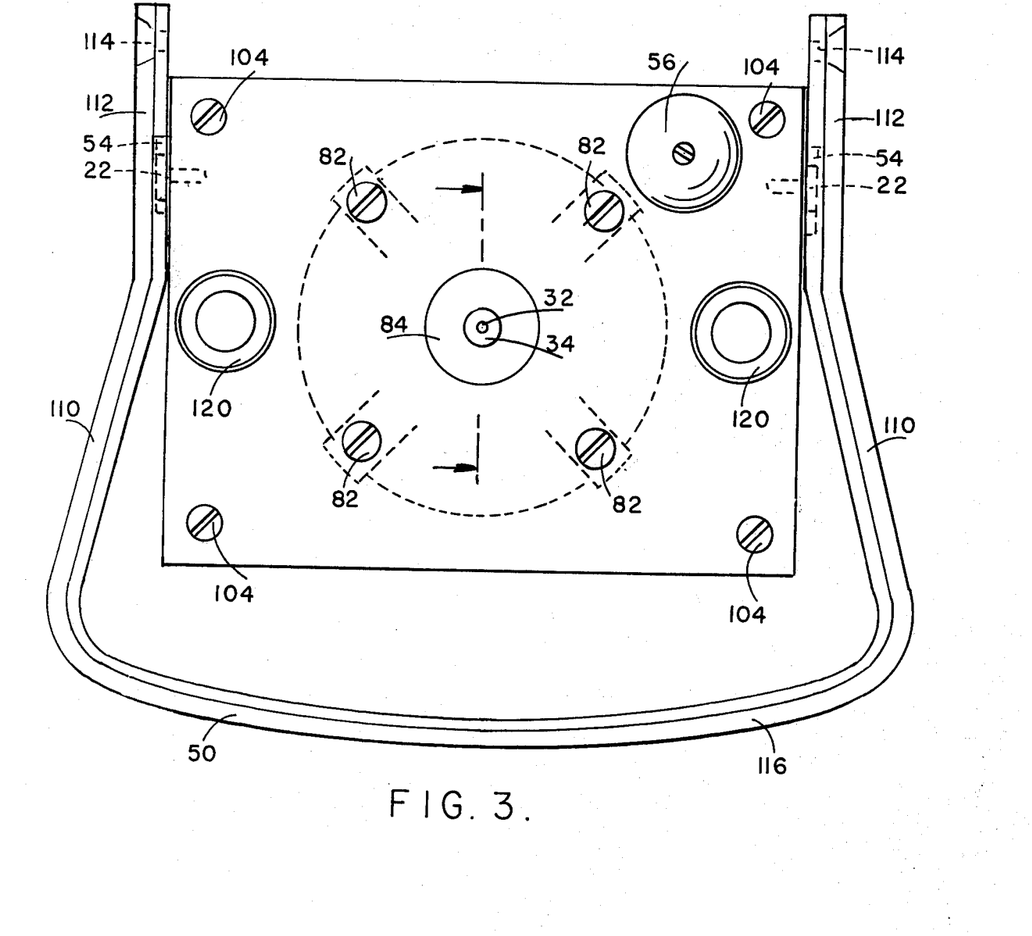
FIG. 3 is a top plan view of the motor housing of the drilling machine of FIG. 2, showing the manner in which the actuating handle is disposed about the periphery of the motor housing cover.
Figures 6, 7:
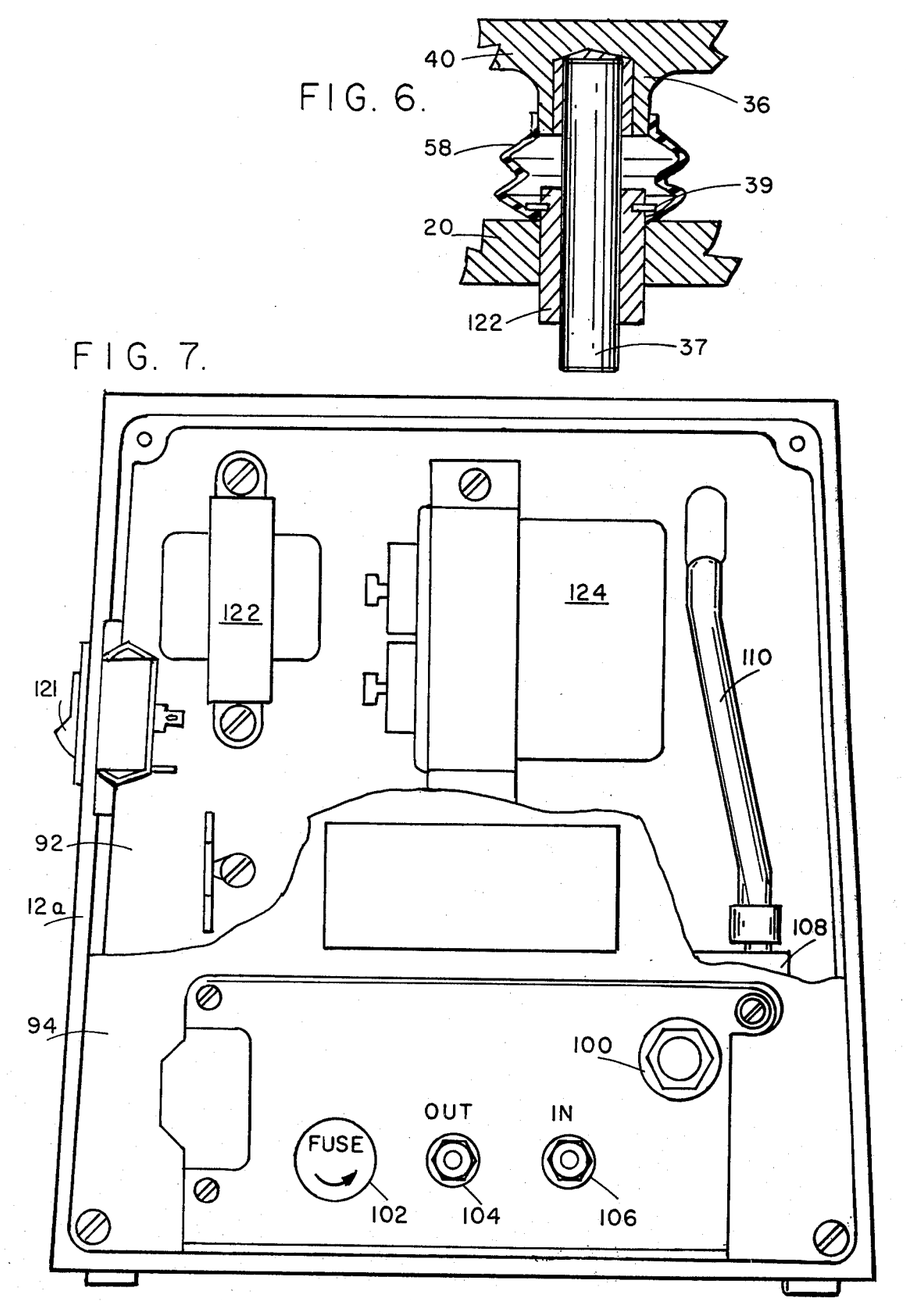
FIG. 6 is a fragmented cross-section of the machine of FIG. 1 along line 6—6, showing the details of the upper guide means for guiding the motor housing in vertical directions.
FIG. 7 is a rear elevational view of the machine shown in FIG. 1, a section of the back cover being removed to indicate the arrangements of electrical and pneumatic components in the frame of the machine.

Guide shafts, shown in FIG. 6, extend downwardly from each of the guide shaft supporting portions 36, 38 and into suitable openings of the motor housing cover 20, as best seen in FIG. 3. To prevent dust as well as drill shavings or chips from interfering with the smooth operation of the upper guide shafts, dust boots 58 are disposed about each guide shaft and extend between the guide shaft supporting portions 36, 38 and the motor housing cover 20. The vertical extent of the dust boots 58 is best shown in FIGS. 2 and 6.

Figure 10:
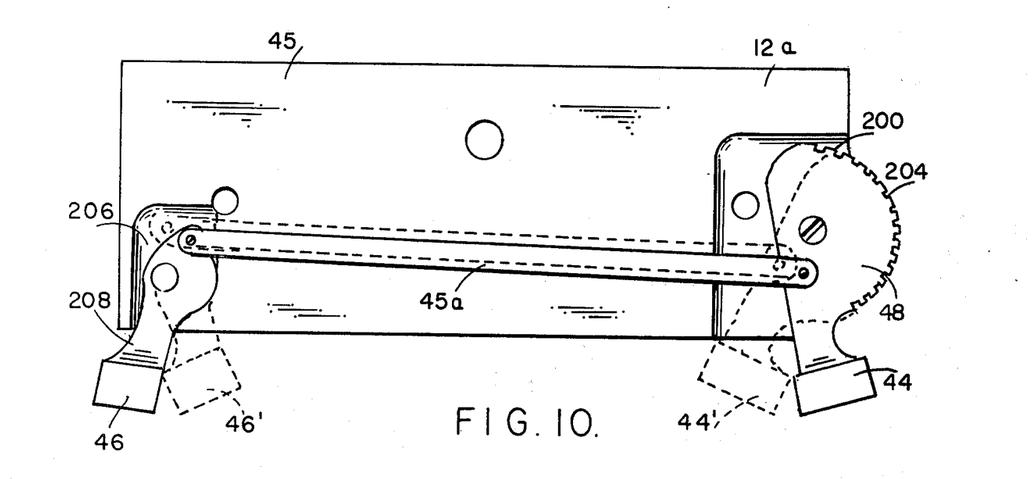
FIG. 10 is a top plan view of the top of the frame of the drilling machine as shown in FIG. 1 with the drilling platform removed, showing a linkage-operated locking device including left and right stops which are movable between free and locking positions for respectively permitting the handle to pivot about the frame or for preventing such movement thereof.

As best seen in FIG. 2, the drilling platform 40 is disconnectable from the upright frame portion 12a by any suitable or conventional means. Separation of the drilling platform 40 from the upright frame portion 12a exposes an upper horizontal portion 45 along which extends a stop link 45a associated with the left and right stops 46, 44 respectively, as best shown in FIG. 10.

An overhanging locating light assembly 60, best shown in FIG. 2, supports a lense housing 62 in which is movably mounted a lense assembly 64. A lense assembly 64 is upwardly and downwardly movable in the lense housing 62 so that a beam of light passing through a lense in the lense assembly 64 may be focused on the drilling platform 40 or a work piece supported on the latter. The lense housing 62 as well as the lense aseembly 64 is disposed above the opening 41 and is vertically aligned therewith so that a light beam eminating from the lense assembly 64 is in vertical alignment with the drill bit 32 and passes through the opening 41.

An indicating light 66 is frontally provided on the light assembly 60 to provide an indication to a technician operating the drilling machine that the machine is electrically energized, as to be more fully described in connection with FIG. 9. The light indicator 66 may comprise a transparent or translucent plastic portion which extends through the frame of the light assembly 60 and is proximately positioned to a bulb 68. The bulb 68, when lit, simultaneously provides the light indication at the light indicator 66 as well as provides a light beam which passes through the lens assembly 64 towards the drilling platform opening 41. The bulb 68 is mounted in a lamp holder 70 which is slidably mounted on the light arm 60 by means of a spring clip 72. The lamp holder 70, consequently, is movable from the normal position shown in FIG. 2 towards the rear of the light assembly. When the lamp holder 70 is totally withdrawn from the confines of the spring clip 72, the lamp holder 70 and the bulb 68 may be withdrawn from the light assembly 60, for example, for purposes of changing a defective bulb 68. A gripping member 74 may be provided which is is connected to the lamp holder 70 which facilitates the gripping of the lamp holder 70 for purposes of rearward movement as above described. The light arm assembly 60 defines an open cavity or compartment 74 which is closable by a cover 74a. An electrical wire 76 which supplies the bulb 68 with electrical energy may extend from the lamp holder 70 through the compartment 74 for connection with the electrical components of the circuit, as to be more fully described in connection with FIG. 9.

Referring to FIGS. 2 and 3, the drilling machine 10 is provided with a motor 80 which is enclosed in the motor housing 19 and which is securely mounted to the motor housing cover 20 by means of screws 82 or in any other conventional manner. A motor shaft shield or bearing 84 is disposed between the opening in the motor housing cover 20 and the drill shaft for reducing friction therebetween. The shield 84 may be in the form of a roller bearing or any elastomeric material which does not develop high frictional forces such as Teflon or Nylon. The details of the chuck assembly 34 may be conventional and do not form an important feature of the present invention. Any suitable chuck assembly may be utilized.

The upright front portion 12a defines a cavity or compartment 92 which has one side thereof closable by a back cover 94. The compartment 92 is suitable for housing most of the electrical as well as pneumatic components which will be described in more detail hereafter. For example, a capacitor 96, which is relatively large in size, may be mounted on the upright cast frame portion. An air regulator 98 may be mounted, for example, on the back cover 94 and an external air supply input 100, in communication with the air regulator 98, thereby becomes easily excessible exteriorly. It should be made clear at this point that the arrangement of electrical and pneumatic components in the manner described is merely illustrative and is not intended to be limiting of the many different possible ways in which the electrical and pneumatic components may be arranged while still achieving the objects of the present invention. Other equivalent arrangements or positions of the components will become readily clear to one skilled in the art once provided with the teaching of the present application.

Referring to FIGS. 2 and 3, four screws 104 are each disposed at another corner of the motor housing cover 20 — the screws 104 being utilized to clamp the motor housing cover 20 to the motor housing 19. As described above, the screws 82 are utilized to fasten the motor 80 to the underside of the motor housing cover 20. Also as shown in FIG. 3 is the adjustable stop 56 which projects from the motor housing cover 20 as above described. In accordance with the presently preferred embodiment, the adjustable stop 56 is provided with an upper groove which may be engaged by a screw driver tip inserted through an opening in the drilling platform 40 (not shown) disposed directly above the groove or slot of the adjustable stop 56. Alternately, the adjustable stop 56 may be manually gripped and adjusted. Adjustable stop 56 is advantageously provided with a lower part of the screw portion (not shown) which is meshingly engaged with a threaded portion in the motor housing cover 20. By turning the adjustable stop 56 either with a screw driver or manually, the degree to which the adjustable stop 56 meshes with the motor housing cover 20 determines the extent to which the adjustable stop 56 extends above the motor housing cover 20.

Still referring to FIG. 3, drill platform guide bearings 120 are shown disposed at each side of the chuck assembly 34. The guide bearings 120 may merely consist of bushings such as the shield 84 or the sleeve or bearing 90, or may consist of bearings for linear motion which minimize the friction encountered by a guide shaft (not shown) which moves vertically through the bearings 120.

Figures 4, 5:
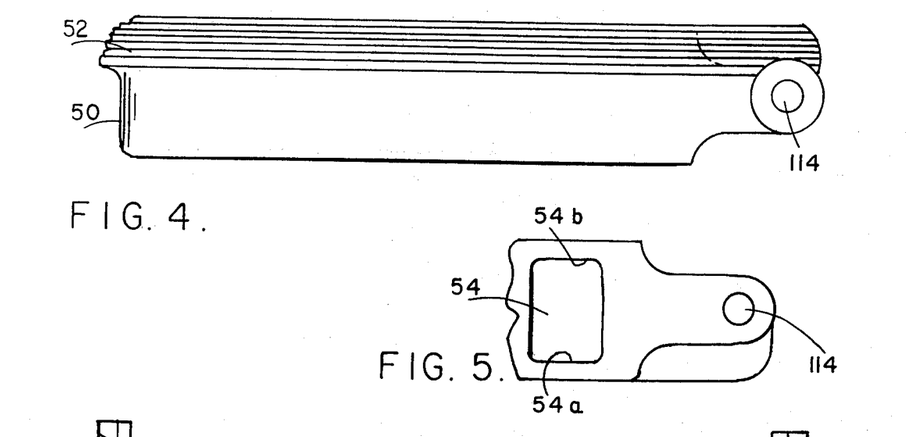
FIG. 4 is a side elevational view of the actuating handle shown in FIGS. 1 and 3.
FIG. 5 is a fragmented side elevational view of an interior portion of the handle of FIG. 4, showing a depression in the handle which engages pivot standoffs projecting from the motor housing cover.

Referring to FIGS. 1–5, an important feature of the present invention is the provision of the handle 50 which is disposed adjacent the drilling platform 40 and which can be gripped to manually advance or raise the drill bit 32 while simultaneously gripping with both hands the work piece or dental cast or model which is disposed on the drilling platform. In the presently preferred embodiment, the handle 50 is substantially U-shaped as best shown in FIG. 3. The handle 50 comprises two spaced substantially parallel members and a transverse member in the form of a front gripping portion 116. Each spaced parallel member includes a pivot arm 112 at the free end of which is provided a hole 114. A moment arm portion 110 extends between the pivot arm portions 112 and the front gripping portion 116. Intermediate the pivot arm portion 112 and the moment arm portion 110 on each parallel member is provided a depression 54. The depression 54 on each parallel member is provided on an inwardly facing surface which faces the other parallel member or which faces the motor housing cover 20 when the handle 50 is mounted on the assembled drilling machine 10. The details of the holes 114 as well as of the depressions 54 are shown in FIGS. 4 and 5. As clearly shown in FIGS. 1 and 3, the dimensions of the depressions 54, in substantially vertical planes, are greater than the dimensions of the pivot standoffs 22. More particularly, as best shown in FIGS. 1 and 3, each depression 54 is provided with a lower abutting surface 54a and an upper abutting surface 54b. The spacing of the abutting surfaces 54a and 54b are greater than the vertical dimensions of the pivot standoffs. Consequently, the pivot standoffs are permitted limited freedom of movement while projecting into their respective depressions prior to engaging one or the other of the abutting surfaces. The handle 50 is pivotally connected to the upright frame portion 12a by means of screws (not shown) which pass through the holes 114 into the frame. The screws, or other projections, which pass through the holes 114 form pivotting means about which the handle 50 may pivot in response to raising or lowering of the front gripping portion 116. In the normal, or lower position of the front gripping portion 116, the pivot standoffs 22 are positioned inside the depressions 54 at points intermediate the abutting surfaces 54a, 54b.

The motor housing 19 is vertically movable between a rest, normal or first lower position and an upper drilling position. In the lower position of the housing, the drill bit 32 is disposed below the top surface 40' while extending above said surface when the motor housing is moved upwardly to the drilling position. The motor housing 19 normally reverts to its rest or lower position under its own weight. Actuating means, either in the form of the manually operable handle 50 or the pneumatic system to be described, is effective for moving the motor housing 19 from its lower rest position to its upper or drilling position. The dimensions of the depressions 54 must so selected so that upward movement of the front gripping portion 116, or pivotting of the handle 50, causes the lower abutting surface 54a to abut against the pivot standoffs 22 and urge the motor housing 19 to move upwardly or vertically while pivotting relative to the handle. Consequently, the abutting surface 54a must be provided at a point which permits full movement of the motor housing 19 from its rest to its uppermost drilling position when the handle 50 is moved within a predetermined pivotting range.

As will be more fully described hereafter, the motor housing 19 can also be actuated or raised by pneumatic means independently of the handle 50. In this mode of operation, the handle 50 is advantageously locked by means of the right and left stops 46, 44. The interposition of the stops between the abutment portions 42 and the moment arm portions 110 of the arm 50 clearly prevents the upward movement of the front gripping portion 116. Thus, the dimensions of the depression 54 must be so selected so that the motor housing 19 with its pivot standoffs 22 can move upwardly to its full drilling position without interference from the handle 50. More specifically, the upper abutting surface 54b must be so positioned so that the pivot standoffs may move upwardly while extending into the depressions 54 without engaging the abutting surfaces 54b until the motor housing 19 moves to its uppermost drilling position. It should be clear from the above, that the spacing between the lower and upper abutting surfaces 54a and 54b should at least be equal to the vertical distance travelled by the motor housing 19 while moving from its rest to its upper or drilling position. Advantageously, the spacing between the abutting surfaces is selected to be slightly greater than the last described spacing in order to insure that the handle does not interfere with pneumatic actuated operation.

By disposing the handle 50 adjacent the substantial periphery of the drilling platform 40, it should be clear that a technician operating the drilling machine may simultaneously grip the handle 50, either in the front or on the sides, and a work piece or dental model or cast which is disposed on top of the drilling platform 40 to thereby secure the model while it is being drilled. This is a particularly advantageous feature in connection with dental models which are typically made from plaster and therefore are soft and brittle and irregular and not suitable to be gripped or clamped by conventional mechanical means. Also, since many holes are commonly drilled in dental models, the fact that the model or work piece need not be mechanically clamped speeds up the drilling operation.

By providing the depth limiting stop 56, the depth of the holes drilled in the dental model can be closely regulated. The depth limiting stop 56 also prevents upward movement of the motor housing cover 20 sufficient to come into contact with the lower surface of the drilling platform 40. By always maintaining a space between the motor housing cover 20 and the drilling platform 40, injury to a technician's fingers which inadvertently are positioned between the stationary drilling platform 40 and the upwardly movable housing cover 20 is thereby prevented.

Referring to FIGS. 1, 3 and 6, the details of an upper guide are shown in connection with a slightly different embodiment of the guide means. The guide shaft supporting portion 36 depends from the drill platform 40 and an upper guide shaft 37 is fixedly mounted in the guide shaft supporting portion in any conventional manner. A bushing 122 secured to the motor housing cover 20 by any suitable means, e.g. a retaining ring 39, functions to minimize the friction between the guide shaft 37 and the motor housing cover 20 when the latter moves with respect to the drilling platform 40. Although a bushing 122 is shown in FIG. 6, it is clear from the description of FIG. 3 that bearings for linear motion may similarly be used. Also shown in FIG. 6 is the manner in which the dust boot 48 fully encloses the otherwise exposed portions of the shaft 37 to prevent drilling shavings and chips from entering the bushing or bearing and thereby interfere with the operation of the latter.

In FIG. 7, similarly to FIG. 2, possible electrical and pneumatic component positions are shown. However, as before, these positions are merely illustrative and the components may be arranged in any other suitable manner. In FIG. 7, a switch 121 is shown mounted on the side of the upright frame portion 12a while a transformer 122 and an electrolytic capacitor 124 are positioned interiorly of the compartment 92 closable by the cover back cover 94. External valve pneumatic switch connectors 104, 106 are provided for purposes to be described. A flow or speed control valve 108 is connected to the air cylinder 86, shown mounted in the motor housing 19 of FIG. 2 by means of a tubing section 110. The manner of connection and the details of the pneumatic as well as the electrical systems will be more further described in connection with respective FIGS. 8 and 9.

Figure 8:
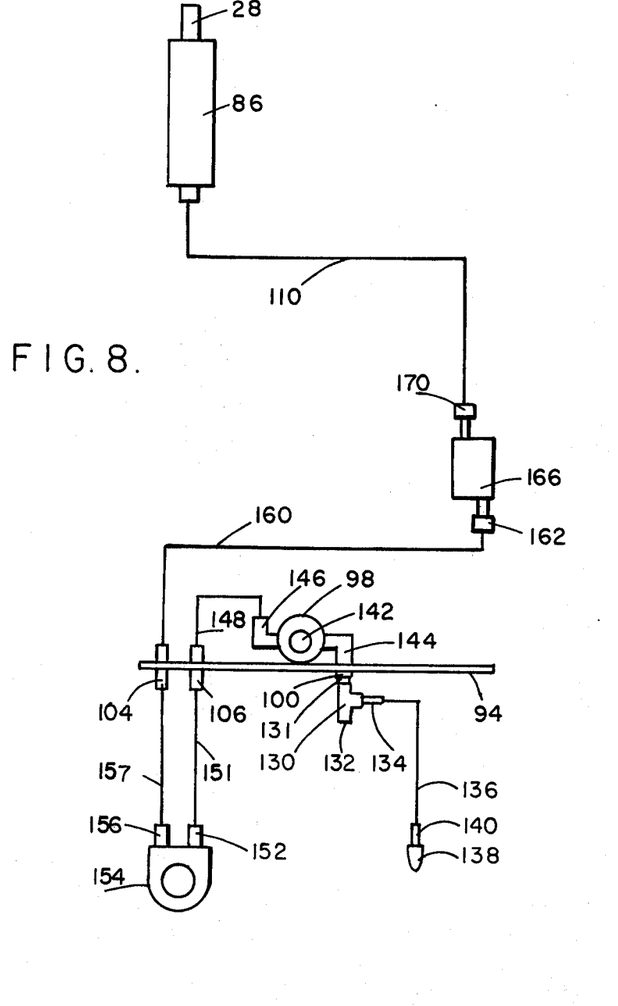
FIG. 8 is a schematic representation of the hydraulic system utilized in conjunction with the machine shown in FIG. 1 for actuating the latter as an alternate to the manually actuatable handle.

As above described, one mode of operation of the drilling machine 10 is the manual mode whereby the handle 50 is utilized to initiate drilling by raising the motor housing 19 to its drilling position. Another mode of operation which is possible with the drilling machine in accordance with a presently preferred embodiment is a pneumatic mode. Referring to FIG. 8, the cylinder 86 mounted in the motor housing 19 in FIG. 2 is shown to have an extendable shaft or piston rod 28 in FIG. 1 which is engageable, in an extended position of the latter, with a frame ledge 16 of the frame. The air cylinder 86 may be of any conventional type known to those skilled in the art which includes a piston to which the piston rod 28 is connected. The piston (not shown) and consequently the piston rod 28, are movable in response to filling the cylinder 86 with air. At such time, the piston rods 28 extends outwardly from the cylinder 86 from its normally retracted position and engages the frame ledge 16. Since the frame ledge 16 is stationary, the tendancy of the piston rod 28 to move downwardly is translated into an upward movement of the motor housing 19. The cylinder 86 is selected and the extent to which the piston rod 28 extends is so regulated so that the motor housing 19 may move from its lower or rest position to its upper or drilling position, similarly as with manual operation of the handle 50.

Although the pneumatic system being described in connection with the present invention intails the use of air, it should be clear that any other type of hydraulic system utilizing any other fluid may similarly be used as will be evident to those skilled in the art.

The manner of regulating the flow of air into the cylinder 86, and consequently the regulation of movement of the motor housing 19 towards its drilling position, will now be described with reference to FIG. 8. Connected to the external air supply input 100 mounted on the back cover 94 is a "Tee" connector or fitting 130 which has an opening 132 connectable to an external supply of air pressure. Connected to another opening of the connector 130 is a cotton covered hose 136 by means of a hose coupling and clamp 134. A blow gun 138 is connected to the cotton covered hose 136 by means of a hose coupling and clamp 140. The provision of the blow gun 138 is optional and provides a source of blown air which may advantageously be used to blow the drill shavings and chips off of the drilling platform as well as from the model itself. However, the external source of air pressure may, if desired, be directly connected to the external air supply input 100.

On the other side of the external air supply input 100, is provided an elbow 144 connected to an air pressure regulator 98. Air pressure regulation is controlled by a regulator nut 142. The construction of the pressure regulator 98 is well known to those skilled in the art and does per se form an important feature of the present invention.

The elbow 146 is connected to a foot air valve or open-close air valve 154 in a conventional manner, e.g. by means of tubing 148, connector 106, tubing 151 and male connector 152. The foot-operated air valve 154 is connected to a flow or speed control valve 166 in any conventional manner e.g. male connector 156, tubing 157, connector 104, tubing 160 and hose clamp sleeve 162. The flow or speed control valve 166 is connected to the air cylinder 86 by means of hose clamp sleeve 170 and tubing 110.

The desirable pneumatic components in the system of FIG. 8 include the air pressure regulator 98, the foot operable air valve 154, the flow control valve 166, and the air cylinder 86. The specific hardware and manner of connection of these components to each other is conventional and well known to those skilled in the art.

The air pressure regulator 98 converts the external air pressure at the input 132 to a desired air pressure in the tubing 148 and 151.

Normally, the foot air valve or open-close air valve 154 prevents communication between the tubings 151 and 157 so that the regulated pressure in the former is not transmitted to the latter. Consequently, the air pressure in the tubings 157, 160, and 110 is low and the piston as well as the piston rod 28 may move to its contracted position under the weight of the motor housing 19. When the foot air valve 154 is operated, the tubings 151 and 157 are placed into communication with one another and the regulated air pressure and the tubing 151 is transmitted to the tubings 157, and 160. The purpose of the flow or speed control valve 166 is to prevent the instantaneou appearance of the regulated pressure transmitted to the tubing 160 to the tubing 110 since such instantaneous pressure build up would cause the piston rod 28 to extend very rapidly with consequent rapid upward movement of the motor housing 19 to its ultimate drilling position. Such rapid movement of the motor housing 19 is undesirable since this may result in the drill bit 32 or the plaster dental cast being damaged. Thus, after the regulated pressure has been applied to the tube 160, the speed control valve 166 permits the gradual build up of the pressure in the tubing 110 until the pressure in the latter reaches or becomes equal to the regulated pressure. At such time, the piston rod 28 is extended in its outermost position.

Advantageously, the foot-operated air valve 154 is of the type which places the tubing 157 in communication with the atmospheric pressure or vents the tubing 157 when the air valve 154 is released or disengaged. In this manner, the pressure built up in the hydraulic lines between the foot air valve 154 and the air cylinder 86 can be reduced by expelling the compressed air in those lines into the atmosphere. Thus, the foot air valve 154 essentially places the lines 151 and 157 in communication with each other in its actuated state while placing the tubing 157 in communication with the atmosphere in its deactivated state. Any other known or conventional means for venting the air as above described may equally be utilized.

Figure 9:
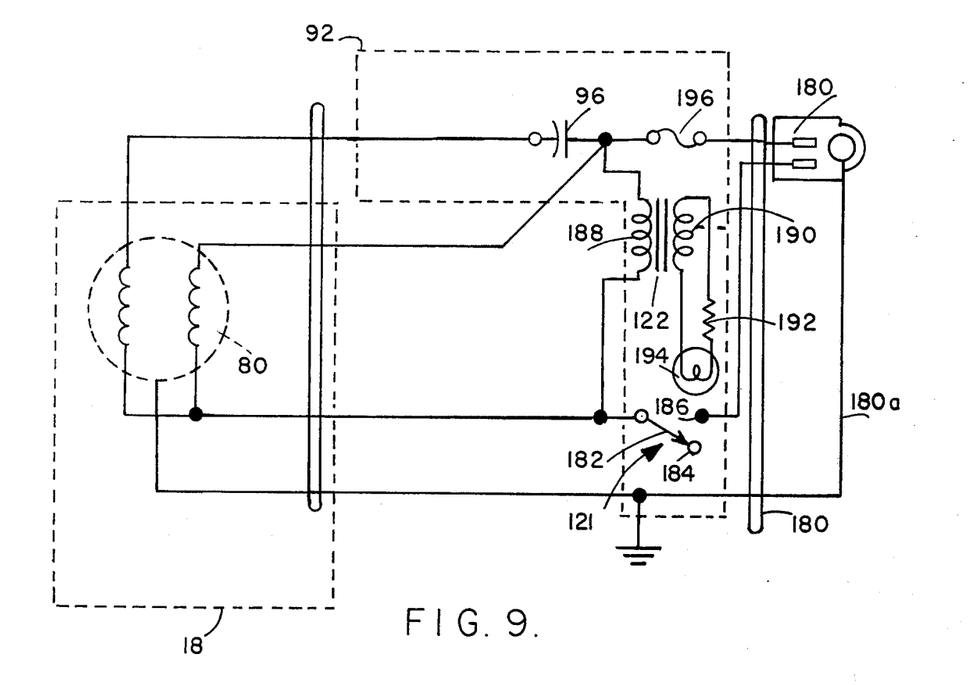
FIG. 9 is a electrical schematic diagram of the electrical components utilized in the drilling machine of FIG. 1, showing connections to both a motor as well as to a lamp.

The electrical circuit utilized in connection with the drilling machine 10 is shown in FIG. 9. The motor 80 is shown disposed in the dashed box 18 designating the motor housing. On the other hand, a fuse 196, a capacitor 96, the transformer 122 and the switch 121 are shown grouped in the frame compartment 92. As suggested above, this distribution of electrical components is purely arbitrary and any other suitable arrangement may be used.

A plug assembly 180 is shown which has a grounding wire 180a connected to the ground potential of the circuit. One of the AC plug leads is connected to the fuse 196 while the other lead of the AC plug assembly is connected to a stationary "on" switch contact 186. Another stationary switch contact 184 is left floating. A movable contact 182 of the switch 121 is movable between the contacts 184 and 186. The switch 121 may be of a single pole-double throw type.

The primary winding 188 of the transformer 122 is connected on the other side of the fuse 196 and to the movable contact 182. Also connected to the other side of the fuse 182 is a capacitor 96 which is connected to one winding lead of the motor 80. The lead of another winding of the motor 80 is connected directly to the other side of the fuse. The other terminals of the two windings of the motor are connected to the movable contact 182 of the switch 121. The case of the motor 180 is shown grounded. The connections and operation of the motor 80 is well known to those skilled in the art and need not be described in the subject application.

A secondary winding 190 is coupled to the primary winding 188 and has connected thereto the lamp 68 and a current limiting resistor 192 connected in series with the lamp.

When the AC plug assembly 180 is plugged into an AC outlet, the electrical circuit is initially deenergized when the movable contact 182 is engaged with the "off" stationary contact 184. However, when the movable contact 182 is moved to the on stationary contact 186, the AC line voltage is applied across the primary winding 188 and simultaneously applied to the windings of the motor 80 both directly and through the capacitor 96 respectively. The application of the AC line voltage across the primary winding 188 causes a voltage to be induced in the secondary winding 190 with consequent lighting of the bulb or lamp 68. The resistor 192 simply prevents excessive currents to flow through the lamp 68 which may damage the latter.

It should be clear that whenever the switch 121 is turned to the on position, the motor 80 is energized as is the lamp 68. Accordingly, the motor 80 continuously turns and the lamp 68 is continuously lit so long as the switch 121 is in the on position.

Referring to FIG. 10, the horizontal frame portion 45 is shown when the drilling platform normally resting thereon is removed. The details of the stops or locking means are shown. Although depressed portions 200 and 206 have been shown opposite sides of the vertical frame portion, the provision of such depressed portions is not critical and the same or similar handle-locking means may be provided and mounted directly on the top surface of the horizontal frame portion. Pivotally mounted in the depressed portion 200 is the arm 48 which has a circular portion which extends beyond the end of the horizontal frame portion 45. In this manner, the arm is readily accessible exteriorly of the drilling machine, as shown in FIG. 1. The rounded or circular portion of the arm 48 is advantageously provided with notches or serrations 204 which facilitate the manual gripping of the arm and for pivotting the arm 48 about a vertical axis. Connected to the arm 48 is the right stop 44 described above. On the other side of the vertical frame portion 45, there is provided in a depressed portion 206 a lever 208 which is pivotally mounted in a similar manner as is the arm 48. A linkage 45a connects opposite ends of the arm 48 and the lever 208. Thus, the linkage 45a is connected to the arm 48 in front of its pivot point while being connected to the lever 208 rearwardly of the pivot point of the latter. Connected to the lever 208 is a left stop 46 above described. The locking mechanism shown in FIG. 10, including the linkage 45, is so arranged so that when the arm 48 is pivotted in a clockwise direction, as viewed in FIG. 10, the linkage 45a is urged towards the left — this causing the lever 208 to pivot in a counterclockwise direction. The locked position of the handle is represented by the right and left stops 44, 46 in FIG. 10 — the stops respectfully extending or being interposed between the abutting portions 42 of the drilling platform 40 and the moment arm portions 110 of the handle 50. Accordingly, the handle 50 is prevented from being urged upwardly. When the arm 48 is pivotted in a counter-clockwise direction by engaging the notches 204, the right stop 44 moves to the dashed stop position designated by the reference numeral 44'. At this time, the linkage 45a has caused the lever 208 to pivot in a counter-clockwise direction — bringing the left stop 46 to its unlocking position represented by the reference numeral 46'. Thus, it will be noted that the linkage arrangement permits simultaneous locking or unlocking of the handle at both ends thereof by manipulation of the locking mechanism at only one side.

The operation of the drilling machine, to the extent to which it has not been described above, will now be described. When drilling of the dental model is to be effected, the dental model is placed on the top surface 40' of the drilling platform 40 over the opening 41. The electrical switch 121 is turned to the on position — this causing the motor 80 to start turning and simultaneously lighting the bulb 68. The depth limiting stop 56 may be adjusted to limit the penetration of the drill bit 32 and to select the depth of the holes drilled. The lense assembly 64 may be moved upwardly or downwardly in the lense housing 62 so as to focus the beam of light eminating downwardly therefrom on that portion of the model where a hole is to be drilled. Once the model has been properly positioned by suitable alignment with the light beam, a technician may grip the handle 50 frontally or laterally while simultaneously gripping the model and urging the same onto the drilling platform 40. For manual operation, the arm 48 is manipulated so as to move the stops to their dashed or unlocking positions as shown in FIG. 10. Now the handle 50 is pivotted upwardly about the holes 114 in the handle until the depth limiting stop 56 engages the lower surface of the drilling platform 40 and prevent further upward movement of the motor housing 19. At such time, the handle 50 is released and the motor housing 19, under its own weight, can move vertically downwardly by means of the guide shafts and guide pin. The cast model may now be moved on the drilling platform 40 until the light beam is again focused on another portion which is to be drilled. The identical steps may be followed in drilling a second and subsequent holes.

When pneumatic operation is desired, the handle 50 is advantageously locked and prevented from moving. At such time, the handle 50 plays no part in raising the motor housing 19, but merely serves as a member which may be gripped conveniently while simultaneously gripping the dental model as before for purposes of securing the model during drilling. Consequently, the arm 48 is pivotted to move the stops outwardly in interposed relationship between the abutting portions 42 and the moment arm portions 110 of the handle 50.

Now, with the connector opening 132 in communication with an external source of air pressure, when the foot operable air valve 154 is actuated, air pressure build up in the air cylinder 86 causes the piston rod 28 to extend downwardly and, as a result, cause the motor housing 19 to move upwardly along the guide shafts and guide pin. As described above, the pivot standoffs 22 do not interfere with such operation since the abutting surfaces 54b are sufficiently upwardly disposed so that the motor housing 19 may attain its fully upward drilling position without having the pivot standoffs engage the upper abutting surfaces 54b.

Release of the foot air valve 154 removes the air pressure from the air cylinder 86 and the air pressure in the latter drops as a result of venting to the atmosphere through the valve 154. Consequently, the motor housing 19, under its own weight, again moves downwardly to its rest position. During pneumatic actuation, the technician may grip the handle 50 and the dental model as before to thereby secure the latter during drilling.

An important feature of the present invention is the provision of a focused light beam which is downwardly directed and normal to a horizontal drilling platform. The provision of such a light beam, in addition to locating those portions where holes are to be drilled in precise places, permits dental surveying, as well known to those skilled in the art.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A drilling machine for drilling holes in a plaster cast comprising a frame having a stationary horizontal drilling platform, said drilling platform having an opening therethrough and a top surface adapted to support a cast which is positionable over said opening; drilling means positioned below said drilling platform and vertically movable between two spaced vertical positions, said drilling means being adapted to receive and support a drill bit, said drill means being arranged to maintain the drill bit below said top surface in one of said positions while passing the drill bit through said opening and above said top surface in the other of said spaced positions to thereby drill a hole in the plaster cast positioned on said top surface covering said opening; hydraulic actuating means for moving said drilling means from one of said positions to the other of said positions, said hydraulic actuating means comprising a fluid cylinder connected to said drilling means, said fluid cylinder having a movable piston with a shaft movable relative to said cylinder and engageable with said frame in an extended position, fluid regulating means for selectively supplying fluid to said cylinder to extend said shaft from said cylinder into engagement with said frame; said drilling means including a motor housing, said frame having a lower ledge at least partially disposed below said motor housing, said air cylinder being mounted on said housing, said shaft normally being in a retracted position and being movable to an extended position in response to filling said cylinder with a fluid, said cylinder being arranged to have said engage said lower ledge when fluid is forced into said cylinder, whereby said housing is moved towards said other position.

2. A drilling machine as defined in claim 1, wherein said fluid cylinder is an air cylinder and wherein said hydraulic actuating means comprises a pneumatic line being adapted to be connected at one free end to a source of air pressure and connected to said air cylinder at another free end.

3. A drilling machine as defined in claim 2, further comprising an open-close air valve connected in said pneumatic line for connecting and removing said source of air pressure from said air cylinder.

4. A drilling machine as defined in claim 3, further comprising a speed flow control valve connected in said pneumatic line between said open-close air valve and said air cylinder for regulating the rate of flow of air into said air cylinder when connected to said source of air pressure.

5. A drilling machine as defined in claim 4, further comprising an air pressure regulator connected in said pneumatic line between said open-close air valve and said free end adapted to be connected to said source of air pressure for regulating the magnitude of air pressure applied to said air cylinder.

6. A drilling machine for drilling holes in a olaster cast comprising a frame having a stationary horizontal drilling platform, said drilling platform having an opening therethrough and a top surface adapted to support a cast which is positionable over said opening; drilling means positioned below said drilling platform and vertically movable between two spaced vertical positions, said drilling means being adapted to receive and support a drill bit, said drill means being arranged to maintain the drill bit below said top surface in one of said positions while passing the drill bit through said opening and above said top surface in the other of said spaced positions to thereby drill a hole in the plaster cast positioned on said top surface covering said opening; hydraulic actuating means for moving said drilling means from one of said positions to the other of said positions, said hydraulic actuating means comprising a fluid cylinder connected to said drilling means, said fluid cylinder having a movable piston with a shaft movable relative to said cylinder and engageable with said frame in an extended position, fluid regulating means for selectively supplying fluid to said cylinder to extend said shaft from said cylinder into engagement with said frame; a handle pivotally connected to said frame and engageable with said drilling means, said handle extending at least partially adjacent the periphery of said drilling platform and adapted to move said drilling means from one to the other of said positions independently of the position of said piston shaft, whereby both said handle and the plaster cast to be drilled can be simultaneously manually gripped and said drilling means can be moved by moving said handle while securing the position of the plaster cast during drilling of the latter.

7. A drilling machine as defined in claim 2, wherein said handle includes pivoting means adapted to permit movement of said drilling means towards the other of said positions with said handle stationary, and further including stop means for selectively locking the position of said handle, said handle extending adjacent to the major portion of the periphery of said drilling platform, whereby said handle, when locked, and the plaster cast can be simultaneously gripped and said plaster cast can be secured in position on said drilling platform while said hydraulic means moves said drilling means towards the other of said positions.

8. A drilling machine as defined in claim 6, wherein said drilling means comprises a motor housing, and further comprising adjustable depth limiting means cooperating with said housing and said drilling platform for adjustably limiting the movement of said housing in the direction towards said drilling platform, whereby the depth of the holes drilled in the plaster cast can be closely controlled.

9. A drilling machine as defined in claim 8, wherein said depth limiting means comprises a screw threaded stop meshingly mounted on a surface of said housing facing said drilling platform and having an extended portion which is engageable with the said drilling platform and projects from said housing surface variable distances independent on the extent of meshing engagement of said limiting means and said housing.

10. A drilling machine as defined in claim 6, further comprising a locating light spaced from and vertically aligned with said opening, said locating light being adapted to generate a beam of light directed normally to said top surface and through the center of said opening, whereby said beam of light impinging on a portion of the cast provides an indication that a hole will be drilled in the lit portion when said drilling means moves from one to the other of said spaced positions.

11. A drilling machine for drilling holes in a plaster cast comprising a frame having a stationary horizontal drilling platform, said drilling platform having an opening therethrough and a top surface adapted to support a csat which is positionable over said opening; drilling means positioned below said drilling platform and vertically movable between two spaced vertical positions, said drilling means being adapted to receive and support a drill bit, said drill means being arranged to maintain the drill bit below said top surface in one of said positions while passing the drill bit through said opening and above said top surface in the other of said spaced positions to thereby drill a hole in the plaster cast positioned on said top surface covering said opening; hydrauliuc actuating means for moving said drilling means from one of said positions to the other of said positions; said hydraulic actuating means comprising a fluid cylinder connected to said drilling means, said fluid cylinder having a movable piston with a shaft movable relative to said cylinder and engageable with said frame in an extended position, fluid regulating means for selectively supplying fluid to said cylinder to extend said shaft from said cylinder into engagement with said frame; said drilling means including a housing and guide means for vertically guiding said housing, said guide means comprising two downwardly extending guide shafts extending from said drilling platform to each side of said opening, and corresponding holes in the top of said housing adapted to receive respective ones of said guide shafts, and an upwardly extending guide pin extending from said frame and a corresponding hole in the bottom of said housing adapted to receive said guide pin.

* * * * *